(12) United States Patent
Krishna et al.

(10) Patent No.: US 11,275,630 B2
(45) Date of Patent: Mar. 15, 2022

(54) TASK-RELATED SORTING, APPLICATION DISCOVERY, AND UNIFIED BOOKMARKING FOR APPLICATION MANAGERS

(71) Applicant: Google LLC, Mountain View, CA (US)

(72) Inventors: Golden Gopal Krishna, Berkeley, CA (US); Carl Magnus Borg, San Francisco, CA (US); Miroslav Bojic, San Francisco, CA (US); Henry Owen Newton-Dunn, Mountain View, CA (US); Jacob M. Klinker, Mountain View, CA (US); Mindy Pereira, Santa Clara, CA (US); Devin Mancuso, San Francisco, CA (US); Daniel June Hyung Park, Sunnyvale, CA (US); Lily Sin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 54 days.

(21) Appl. No.: 16/985,935

(22) Filed: Aug. 5, 2020

(65) Prior Publication Data

US 2020/0364099 A1 Nov. 19, 2020

Related U.S. Application Data

(63) Continuation of application No. 16/112,400, filed on Aug. 24, 2018, now Pat. No. 10,783,013.
(Continued)

(51) Int. Cl.
*G06F 9/44* (2018.01)
*G06F 9/54* (2006.01)
(Continued)

(52) U.S. Cl.
CPC .............. *G06F 9/543* (2013.01); *G06F 8/61* (2013.01); *G06F 8/65* (2013.01); *G06F 9/4881* (2013.01); *G06Q 10/10* (2013.01)

(58) Field of Classification Search
CPC ...................................................... G06F 9/543
(Continued)

(56) References Cited

U.S. PATENT DOCUMENTS 7,503,012 B2 * 3/2009 Chen ................. G06F 40/103
715/769
7,801,885 B1 * 9/2010 Verma ................ G06F 16/9535
707/713
(Continued)

FOREIGN PATENT DOCUMENTS

| WO | 2019118011 | 6/2019 |
| WO | 2019118022 | 6/2019 |
| WO | 2019125543 | 6/2019 |

OTHER PUBLICATIONS

"Final Office Action", U.S. Appl. No. 15/974,284, 23 Pages.
(Continued)

*Primary Examiner* — Timothy A Mudrick
(74) *Attorney, Agent, or Firm* — Colby Nipper PLLC

(57) ABSTRACT

This document describes techniques and devices for task-related sorting, application discovery, and unified bookmarking for application managers. Through use of an application manager, multiple applications (including standalone applications, instant applications, websites, and other content) that a person can use to accomplish a single task, or multiple related tasks, are sorted into discrete groups for display in the application manager. The application manager can automatically recognize relationships between activities performed with the applications and recognize user actions with the applications that are related to the activities. Based on the relationships and user actions, the application man-
(Continued)

ager can automatically determine that the activities and actions represent a task and display a task group that includes the applications that represent the task. The task groups may be visually displayed as a stack, strip, or pile of windows or thumbnails representing each application or other content the person could use for the task.

20 Claims, 8 Drawing Sheets

Related U.S. Application Data

(60) Provisional application No. 62/599,295, filed on Dec. 15, 2017.

(51) Int. Cl.
*G06Q 10/10* (2012.01)
*G06F 8/61* (2018.01)
*G06F 8/65* (2018.01)
*G06F 9/48* (2006.01)

(58) Field of Classification Search
USPC .................................................. 719/320
See application file for complete search history.

(56) References Cited

U.S. PATENT DOCUMENTS

| | | | |
|---|---|---|---|
| 8,520,000 | B2 | 8/2013 | Duncker et al. |
| 9,684,546 | B2 | 6/2017 | Peacock et al. |
| 10,013,783 | B1 | 7/2018 | Bhat et al. |
| 10,333,873 | B2 | 6/2019 | Perez et al. |
| 10,620,923 | B2 | 4/2020 | Allan et al. |
| 10,783,013 | B2 | 9/2020 | Krishna et al. |
| 10,846,109 | B2 | 11/2020 | Krishna et al. |
| 10,970,096 | B2 | 4/2021 | Krishna et al. |
| 2007/0156647 | A1 | 7/2007 | Shen et al. |
| 2009/0144262 | A1 | 6/2009 | White et al. |
| 2011/0295847 | A1 | 12/2011 | Cucerzan et al. |
| 2011/0302521 | A1 | 12/2011 | Jiang et al. |
| 2012/0158702 | A1 | 6/2012 | Kumar et al. |
| 2012/0159395 | A1* | 6/2012 | Deutsch ............... G06F 9/445 715/835 |
| 2013/0218836 | A1 | 8/2013 | Sullivan et al. |
| 2013/0326562 | A1 | 12/2013 | Bi et al. |
| 2015/0058318 | A1 | 2/2015 | Blackwell et al. |
| 2015/0128058 | A1 | 5/2015 | Anajwala |
| 2016/0360382 | A1 | 12/2016 | Gross et al. |
| 2018/0060982 | A1 | 3/2018 | Milles et al. |
| 2018/0233141 | A1 | 8/2018 | Solomon et al. |
| 2018/0365899 | A1 | 12/2018 | Wolf et al. |
| 2019/0188013 | A1 | 6/2019 | Krishna et al. |
| 2019/0188059 | A1 | 6/2019 | Krishna et al. |
| 2019/0188322 | A1 | 6/2019 | Krishna et al. |
| 2021/0004247 | A1 | 1/2021 | Krishna et al. |
| 2021/0208908 | A1 | 7/2021 | Krishna et al. |

OTHER PUBLICATIONS

"Final Office Action", U.S. Appl. No. 16/112,400, dated Feb. 3, 2020, 9 Pages.
"First Action Interview Office Action", U.S. Appl. No. 16/112,400, dated Sep. 16, 2019, 3 Pages.
"International Preliminary Report on Patentability", PCT Application No. PCT/US2018/050701, dated Jul. 2, 2020, 6 pages.
"International Preliminary Report on Patentability", PCT Application No. PCT/US2018/047122, dated Jun. 25, 2020, 12 pages.
"International Preliminary Report on Patentability", PCT Application No. PCT/US2018/050295, dated Jun. 25, 2020, 9 pages.
"International Search Report and Written Opinion", PCT Application No. PCT/US2018/047122, dated Oct. 22, 2018, 17 pages.
"International Search Report and Written Opinion", PCT Application No. PCT/US2018/050295, dated Nov. 22, 2018, 15 pages.
"International Search Report and Written Opinion", PCT Application No. PCT/US2018/050701, dated Nov. 27, 2018, 12 pages.
"Non-Final Office Action", U.S. Appl. No. 15/974,284, dated Dec. 18, 2019, 18 Pages.
"Notice of Allowance", U.S. Appl. No. 16/112,400, dated May 13, 2020, 8 Pages.
"Notice of Allowance", U.S. Appl. No. 15/974,284, dated Jul. 27, 2020, 6 Pages.
"Pre-Interview Communication", U.S. Appl. No. 16/008,021, dated Apr. 30, 2020, 24 Pages.
"Pre-Interview Communication", U.S. Appl. No. 16/122,400, dated Jun. 25, 2019, 3 pages.
"Process Explorer", https://en.wikipedia.org/wiki/Process_Explorer Retrieved from Internet on Nov. 9, 2018, 3 pages.
"Foreign Office Actio", EP Application No. 18782839.7, dated Feb. 3, 2021, 5 pages.
"Non-Final Office Action", U.S. Appl. No. 16/008,021, dated Feb. 23, 2021, 30 pages.
"Notice of Allowance", U.S. Appl. No. 17/027,255, dated Dec. 23, 2020, 7 pages.
"Final Office Action", U.S. Appl. No. 16/008,021, dated Aug. 17, 2021, 32 pages.
"Corrected Notice of Allowance", U.S. Appl. No. 15/974,284, dated Oct. 26, 2020, 3 pages.
"Final Office Action", U.S. Appl. No. 16/008,021, dated Aug. 20, 2020, 26 Pages.
"Corrected Notice of Allowance", U.S. Appl. No. 17/027,255, dated Mar. 12, 2021, 2 pages.
"Foreign Office Action", EP Application No. 18782851.2, dated Jun. 4, 2021, 5 pages.
"Foreign Office Action", EP Application No. 18773890.1, dated Oct. 14, 2021, 5 pages.
"Non-Final Office Action", U.S. Appl. No. 16/008,021, dated Nov. 10, 2021, 32 pages.

* cited by examiner

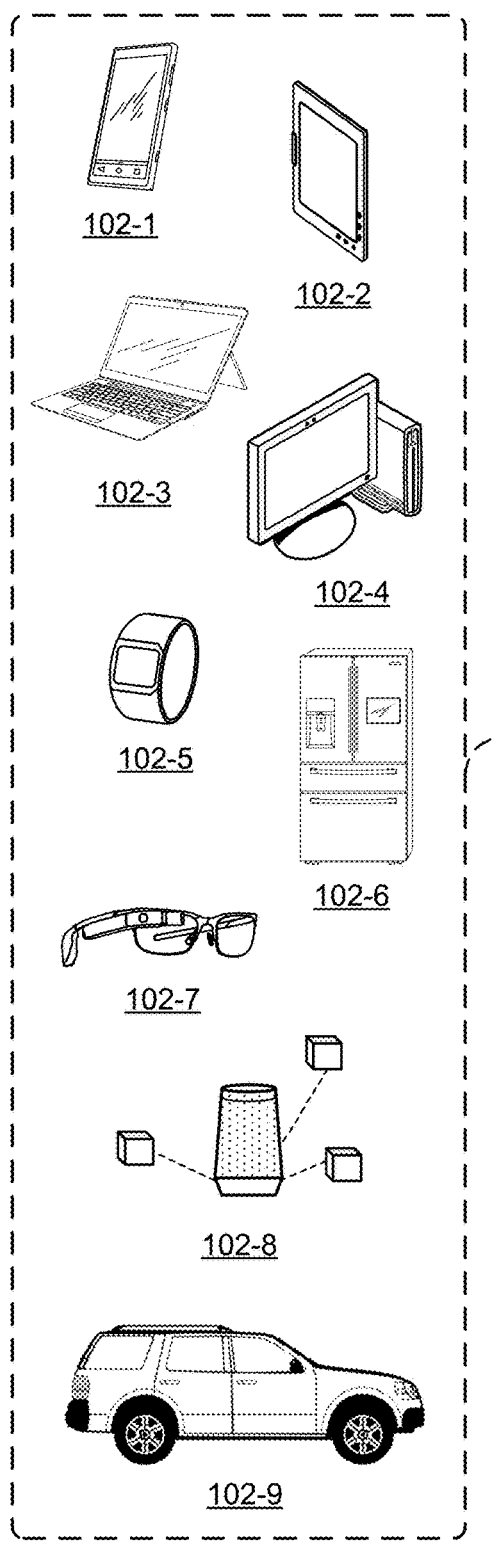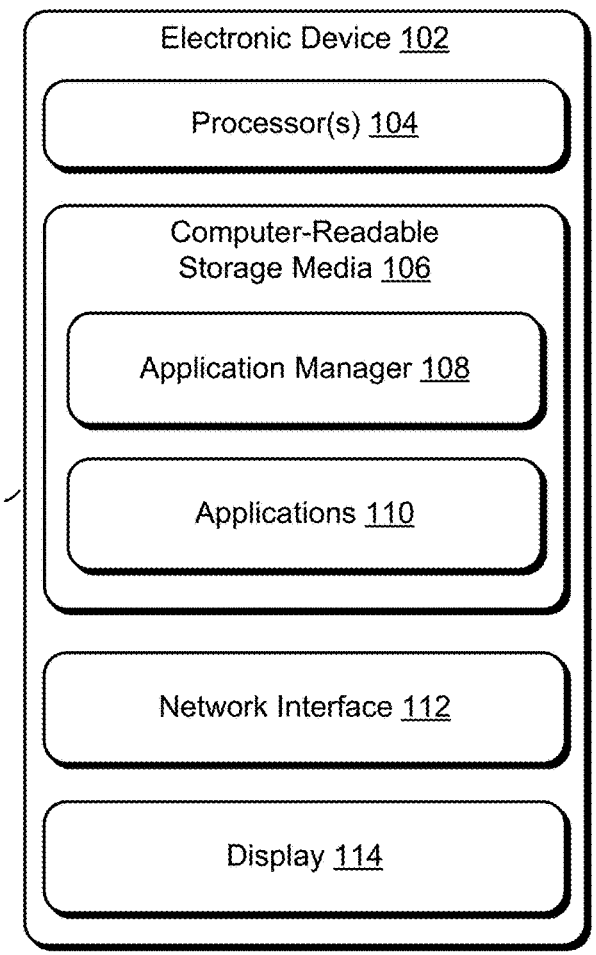
FIG. 1

TASK-RELATED SORTING, APPLICATION DISCOVERY, AND UNIFIED BOOKMARKING FOR APPLICATION MANAGERS

RELATED APPLICATION

This application is a continuation of and claims priority to U.S. Utility patent application Ser. No. 16/112,400, which in turn claims priority under 35 U.S.C. § 119(e) to U.S. Provisional Patent Application 62/599,295, filed on Dec. 15, 2017, incorporated herein by reference in their entireties.

BACKGROUND

An application manager, such as an overview screen or a screen that displays recently viewed content, is a common feature for many electronic devices. Some users primarily use the application manager to close applications because conventional application managers only provide a flat chronological list of recent activity. Users can see just a few of the most-recently used applications in the list and have to scroll through the list to see the rest of them. Further, over time, some items on the list may become outdated, blocked, or otherwise lose their value to the user. Thus, it can be difficult for users to accomplish tasks and improve workflow and productivity using application managers.

Assume, for example, that a person has been preparing for an afternoon meeting with work colleagues by reading emails via an email application and looking at prepared documents on a collaboration website. The person then takes a break before the meeting and uses another application to schedule a weekend event and answers personal emails in a different email application. During the meeting, some questions about the emails and documents come up, and the person goes to the application manager on the person's device to find previously viewed materials that can be used to answer the questions. Further assume that because of the passage of time, the person's intervening personal tasks, and the various applications used to accomplish them, the history of the person's meeting preparation has become obscured, deleted, or unavailable. In this example, and in many similar examples, the application manager does not enable the person to accomplish desired tasks and may even make accomplishing some tasks more difficult.

This background description is provided for the purpose of generally presenting the context of the disclosure. Unless otherwise indicated herein, material described in this section is neither expressly nor impliedly admitted to be prior art to the present disclosure or the appended claims.

SUMMARY

This document describes techniques and devices for task-related sorting, application discovery, and unified bookmarking for application managers. Through use of an application manager, multiple applications (including standalone applications, instant applications, websites, and other content) that a person can use to accomplish a single task, or multiple related tasks, are sorted into discrete groups for display in the application manager. The application manager can automatically recognize relationships between activities performed with the applications and recognize user actions with the applications that are related to the activities. Based on the relationships and user actions, the application manager can automatically determine that the activities and actions represent a task and display a task group that includes the applications that represent the task. The task groups may be visually displayed as a stack, strip, or pile of windows or thumbnails representing each application or other content the person could use for the task.

In some cases, a person can bookmark (or "pin") websites, applications, documents, and other content. Then, all of the bookmarked items will be available in the application manager. In the case of bookmarked items, the techniques can be used to create new tasks that can be shared to other applications, such as a calendar or task manager. For example, if a person is working on documents for a presentation at a conference in another city, the person can pin the documents as a task to perform a final review later, and bookmark the airline website page that shows the person's travel reservations for the conference, along with search results for restaurants and attractions near the conference venue. Later, the person can view the documents, reservations, and search results in a single task group in the task-based application manager. Thus, the person's activity that is related to the conference is organized and available at a convenient location in the application manager.

Aspects described below include an electronic device, having one or more computer processors and one or more computer-readable storage media. The one or more computer-readable storage media include stored instructions that can be executed by the one or more computer processors to implement an application manager. The application manager is configured to perform an analysis of activities associated with applications running on the electronic device and determine, based on the analysis, that at least two particular activities are related activities that are included in a task. The application manager also presents, on a display of the electronic device, a task group. The task group includes representations of the respective applications associated with the related activities, the representations usable to launch the respective associated applications.

Aspects described below also include a system having an electronic device; one or more computer processors; and one or more computer-readable storage media. The computer-readable storage media include stored instructions that can be executed by the one or more computer processors to implement an application manager. The application manager is configured to perform an analysis of activities associated with applications running on the electronic device and determine, based on the analysis, that at least two particular activities are related activities that are included in a task. The application manager also presents, on a display of the electronic device, a task group. The task group includes representations of the respective applications associated with the related activities, the representations usable to launch the respective associated applications.

Aspects described below also include a method, implemented in an electronic device. The method includes performing an analysis of activities associated with applications running on the electronic device. The method also includes determining, based on the analysis, that at least two particular activities are related activities that are included in a task. The method further includes presenting, on a display of the electronic device, a task group that includes representations of the respective applications associated with the related activities, the representations usable to launch the respective associated applications.

Aspects described below also include a system having an electronic device that includes, or is associated with, means for performing an analysis of activities associated with applications running on the electronic device and determining, based on the analysis, that at least two particular activities are related activities that are included in a task. The system also includes means for presenting, on a display of the electronic device, a task group. The task group includes representations of the respective applications associated with the related activities, the representations usable to launch the respective associated applications.

This summary is provided to introduce simplified concepts concerning task-related sorting, application discovery, and unified bookmarking for application managers, which are further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of task-related sorting, application discovery, and unified bookmarking for application managers are described in this document with reference to the following drawings. The same numbers are used throughout the drawings to reference like features and components:

FIG. 1 illustrates an example operating environment in which techniques enabling task-related sorting, application discovery, and unified bookmarking for application managers can be implemented.

DETAILED DESCRIPTION

Overview

Figure 2:
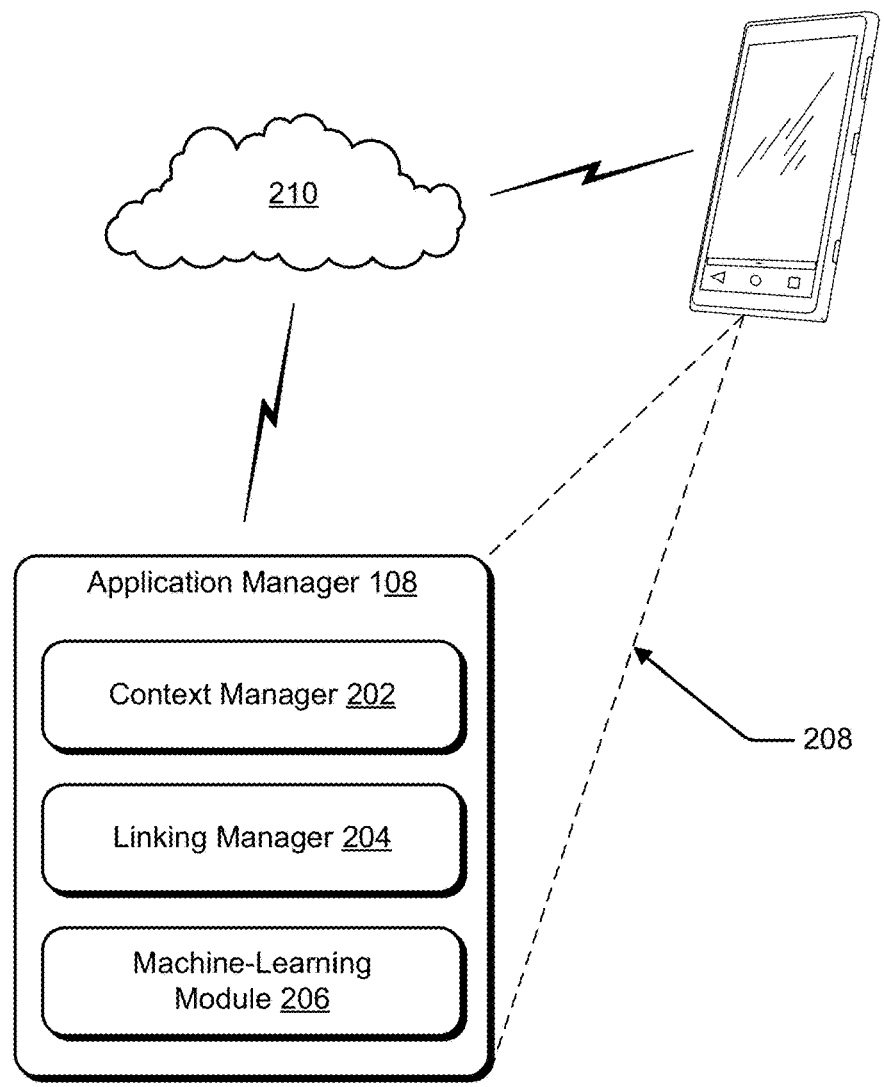
FIG. 2 illustrates an example implementation of the application manager of FIG. 1.

This document describes techniques enabling task-related sorting, application discovery, and unified bookmarking for application managers. These techniques can improve workflow and organization related to computer-aided tasks by organizing the items displayed in an application manager into groups of items related to tasks, surfacing applications and updates to applications that are related to the tasks, and enabling pinned and bookmarked items to be included in the task groups. Furthermore, a machine-learning module can be employed to improve future results based on the person's optional rearranging of the content in the task groups or on an indication of the usefulness of the task groups.

Consider, for example, a case in which a person wants to see a movie with friends. The person may open a video application in the middle of the day and watch a few trailers for new movies. The person then uses a search engine to find out whether any of the potential movie choices are playing nearby. The person bookmarks the theater's schedule and texts a group of friends to invite them to the movie later that evening. Once the group is confirmed, the person accesses an application store to search for and download the theater's ticket application and then uses it to purchase tickets. The person then opens a ride-sharing application and schedules a ride to the theater, with a first stop to pick up two other members of the group. Hours later, just before the movie begins, the two other friends text to say they can't make it. The person now needs to cancel two tickets and adjust the scheduled ride. Using the described techniques, the application manager may display a labeled task group related to the person's movie-planning activities. In this way, the described techniques enable the person to use the application manager to find the necessary applications to make these adjustments.

Consider, as another example, a case in which a person plans to order pizza for a work team meeting the next day. The person uses a search application to find several pizza restaurants near the meeting. During the meeting, the person takes a vote of the participants to choose between the restaurants and then opens the application manager to quickly find an ordering application for the selected restaurant. Assume that the selected restaurant has a long delivery queue and the pizza would arrive too late for the meeting. The described techniques may provide, on the application manager screen, a suggestion to install an application for a third-party delivery service that can pick up the pizza and deliver it in less time. Further, the techniques may suggest an update to the person's restaurant application that enables estimated delivery times to be displayed.

As yet another example, consider the case above in which a person has been preparing for a morning meeting by reading emails and documents. Assume the person reviews all the documents and needs to prepare an agenda that summarizes the discussion about the documents, but, because of an intervening meeting, the person does not have time to write the summary before the intervening meeting. The described techniques may enable the person to bookmark or pin the documents together as a single task that can be viewed later from the application manager. In this way, the person can easily find the documents needed to prepare the agenda, once the other meeting ends.

These are but a few examples of how the described techniques and devices may be used to improve workflow and organization related to computer-aided tasks by organizing the items displayed in an application manager into groups of items related to tasks. Other examples and implementations of which are described throughout this document. The document now turns to an example environment, after which example systems, apparatuses, methods, and components are described.

Operating Environment

FIG. 1 illustrates an example operating environment 100 in which techniques enabling task-related sorting, application discovery, and unified bookmarking for application managers can be implemented. The example environment 100 includes an electronic device 102, which includes, or is associated with, one or more computer processors 104, and a computer-readable storage media 106, which can include various kinds of memory media, storage media, or both.

The electronic device 102 is illustrated with a variety of example devices, including a smartphone 102-1, a tablet 102-2, a laptop 102-3, a desktop computer 102-4, a computing watch 102-5, a smart appliance 102-6, computing spectacles 102-7, a home-automation and control system 102-8, and a vehicle 102-9. The electronic device 102 can also include other devices, such as televisions, entertainment and gaming systems, audio systems, drones, track pads, drawing pads, netbooks, e-readers, home security systems, and other home appliances. Note that the electronic device 102 can be wearable, non-wearable but mobile, or relatively immobile (e.g., desktops and appliances).

The computer-readable storage media 106 also includes an application manager 108, various applications 110, and an operating system (not shown), any or all of which may be implemented as computer-readable instructions, which can be executed by the computer processors 104 to provide some of the functionalities described herein. The application manager 108 is described with additional details in FIG. 2.

The electronic device 102 may also include a network interface 112. The electronic device 102 can use the network interface 112 for communicating data over wired, wireless, or optical networks. By way of example and not limitation, the network interface 112 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network. The electronic device 102 also includes, or is able to communicate with, a display 114.

Generally, the application manager 108 can organize information about activities performed by or with the electronic device 102 and provide a user with accurate and useful tools that can increase productivity and work flow. For example, the application manager 108 can perform an analysis of activities associated with applications running on the electronic device. The activities can include any of a variety of operations, such as operations performed by a user, operations performed by the applications, and so forth. Further a single activity may include multiple elements (e.g., a user action, one or more background operations by the application, and an additional user action in response to the operations). Based on the analysis, the application manager 108 can determine that at least two particular activities are related activities and that the related activities are included in a task. For example, the application manager may determine that a user email, a user interaction with a calendar application, and a user interaction with a restaurant's online reservation system are related activities that are included in a scheduling task (e.g., scheduling a lunch meeting).

Once the task is determined, the application manager 108 can present, (e.g., on the display 114), a task group. The task group includes representations of the respective applications or other entities (e.g., programs, websites, and captured images) associated with the related activities. For example, continuing the example above, the task group can include representations of the user's email program, the user's calendar application, and the reservation system.

The representations may be windows, icons, thumbnail images, or other representations of the associated applications. Examples of the representations are described with additional detail with reference to FIG. 4 through FIG. 7. The representations may be usable to launch the respective associated applications (e.g., when a user interacts with the representation, the associated application launches). In some implementations, the representations can be used to launch the associated application in a saved state (e.g., the application launches and appears as it did when the user last used the application) or in a live state (e.g., the application launches in a default manner and appears as it normally does upon opening). In other implementations, the application manager may create and present an image or "screenshot" of the application as it appeared when last used and present both or either of the screenshot and the representation in the task group.

In some implementations, the application manager 108 performs the described operations (the analysis of the activities, the determination of the related activities that are included in the task, and the presentation of the task group) automatically, without user input or instruction. In other cases, the application manager may perform some or all of the steps at the direction of the user or may provide the user with a user interface (e.g., a dialog window) that allows the user to decide whether the application manager should create the task group. It should be noted that, while the application manager 108 may perform the operations described above automatically and without user input, other operations described in this document may be performed based on, or with consideration of, user inputs.

Additionally, the application manager 108 may enable the user to edit the task group. For example, the application manager 108 can receive the user input indicating that one or more of the particular activities is not a related activity and, in response to the user input, remove the representation of the application associated with the indicated activity from the task group. Similarly, the application manager 108 can receive the user input indicating that an additional activity that was not initially determined to be the related activity, is the related activity. In response, a new representation of the respective application associated with the indicated activity can be added to the task group. User inputs to edit the task group can take any of a variety of formats, such as a drag-and-drop input, an input from a menu or a dedicated control, and so forth. The user may delete an entire task group, add or delete individual representations, or rearrange an order or arrangement of the task group without adding or deleting any representations. In some implementations, the user may add additional representations of a single application, if multiple related activities are performed with the application.

In FIG. 1, the application manager 108 is illustrated as part of the electronic device 102. It should be noted that the application manager 108 (or the computer-readable storage media 106) may be implemented in a separate device, such as a remote server or another electronic device, and communicate with the electronic device 102 via a network connection (e.g., using the network interface 112).

In some implementations, the user may create a new task group by bookmarking or pinning content and designating it as related. For example, the application manager 108 can receive the user input indicating that one or more activities are related activities. The activities may be associated with an application already included in the task group or with other respective applications. Based on the user input, the application manager 108 can automatically cause the application manager to create the new task group or add representations of the other respective applications to an existing task group. Similar to the editing features described above, user inputs to create the new task group can take any of a variety of formats, such as a drag-and-drop input, an input from a menu or a dedicated control (e.g., a "pin" or "bookmark" control), and so forth.

Optionally, the application manager 108 may present the task group with a label (e.g., "lunch meeting"). The label can be based on content of one or more of the related activities, such as a subject line of an email, a time or location of a calendar item, or a title of a file or document (e.g., a name of a video or a meeting agenda). In some cases, the label may be automatically determined by the application manager 108 and editable by the user. In other cases, the application manager 108 may provide a user interface that allows the user to create or select the label for the task group.

Additionally or alternatively, the application manager 108 may be used to help the user accomplish tasks. For example, the application manager 108 may determine an available upgrade to an application presented in the task group, such as an upgrade that can be used to perform one or more activities, or parts of activities, of the task. Similarly, the application manager 108 may determine a new application (e.g., an application that is available, but not currently associated with the electronic device) that can be used to perform one or more activities, or parts of activities, of the task. When the upgrade or the available application is determined, the application manager 108 can display a selectable control that can be used to enable the upgrade or the new application to be installed on the electronic device 102.

FIG. 2 illustrates an example implementation 200 of the application manager 108. In the example implementation 200, the application manager 108 includes, or has access to, a context manager 202 and a linking manager 204. In some cases, the application manager 108 may also include, or have access to, a machine-learning module 206. As shown in FIG. 2 by dotted lines 208, the application manager 108 may be part of the electronic device 102. In other implementations, the application manager 108 may be a separate device (or part of a separate device), such as a remote server or another electronic device, and communicate with the electronic device 102 over a network 210 (e.g., using the network interface 112).

The application manager 108 can work with the context manager 202 and the linking manager 204 to organize the task groups presented by the application manager 108. For example, the context manager 202 can use various techniques to automatically determine relationships between user interactions with different applications, websites, and other content. The relationships can be determined from various factors, including information from applications, internal devices or modules, an application programming interface (API), or user input. The application manager 108 (including either or both of the context manager 202 and the linking manager 204) may receive the information about the applications from the applications using existing connections (e.g., the application manager knows what applications are launched and can determine linkages from the launches).

In other implementations, the application manager 108 may obtain the information by analyzing content and information in the application user interface (e.g., with proper permissions granted by the user). Thus, the application manager 108 may receive information from links between applications, reviews of the electronic device memory, data related to user action (e.g., if the user explicitly links applications or uses copy/paste to transfer text between applications or websites), phone session data, recommendations by applications or websites, another API, display data (e.g., applications that are used together in a split-screen configuration), an operating system of the electronic device, and so forth. Once determined, the application manager 108 can use the relationships to define initial content of the task groups that can be presented by the application manager 108 (e.g., on the display 114). In some cases, the user may have the option to include or exclude various sources of context information that the context manager 202 uses.

The linking manager 204 can automatically determine relationships that are explicitly created by the user (e.g., by the user editing an existing group, pinning related items, or bookmarking related items) and communicate these user-initiated relationships to the context manager 202 and the application manager 108. Using this information, the application manager 108 can update the task group determined by the context manager 202 or display a separate task group related to the user's actions. In some cases, the linking manager 204 may also create a task based on groupings made by another application that is separate from the application manager 108 (e.g., a task manager or a "to-do list" application). The context manager 202 and the linking manager 204 can also work with the application manager 108 to determine whether there is a new application (or an upgrade to an applications already being used) that may help the user perform the tasks.

The machine-learning module 206 receives information about the groups and about the user's actions and communicates with the application manager 108 to improve the processes used to create and manage the content displayed by the application manager 108. For example, the application manager 108 (e.g., using the machine-learning module 206) can analyze user inputs that are associated with the related activities, and, based on the analysis of the user input, use machine-learning techniques to modify one or more processes that correspond to either or both of the analysis of the activities associated with applications running on the electronic device or the determination that at least two particular activities are related activities that are included in a task, in order to improve an accuracy of the determination of related activities. It should be noted that the user inputs described with reference to analysis by the machine-learning module 206 are actions such as the user editing the task group (e.g., by moving a representation from one task group to another, deleting an item from a group, or deleting an entire group). Thus, the application manager 108 or the machine-learning module 206 may consider user action in this context even when user actions are not considered in the analysis of the activities associated with applications running on the electronic device, the determination that at least two particular activities are related activities that are included in a task, or in presenting the task group.

Consider, for example, a case in which the application manager 108 creates the task group that includes several representations. The user may review the task group and determine that one representation is associated with a repeating calendar reminder that does not belong in the group (e.g., the user was working on the documents and just happened to interact with the reminder in between documents). In this case, the machine-learning module 206 may teach the application manager 108 that repeating calendar reminders are not to be included in the task group unless the context of the reminder is unmistakably related to the other items in the task group. In this way, subsequently created task groups may more-accurately reflect related activities and thereby save the user time and improve the user's experience with the application manager 108.

These and other capabilities and configurations, as well as ways in which entities of FIG. 1 act and interact, are set forth in greater detail below. These entities may be further divided, combined, and so on. The example environment 100 of FIG. 1 and the detailed illustration of FIG. 2 illustrates some of many possible environments and devices capable of employing the described techniques.

Example Methods

Figure 3:
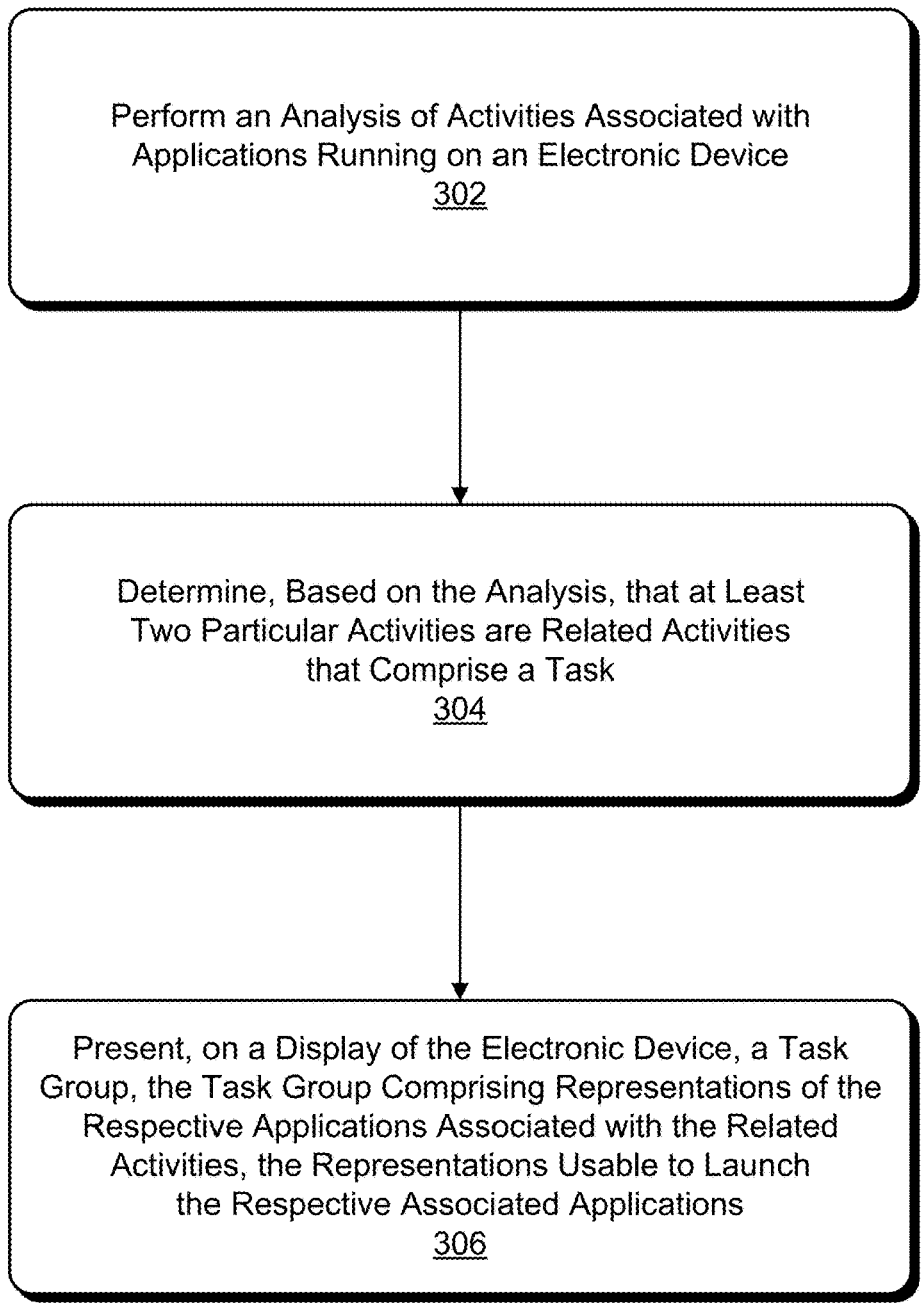
FIG. 3 depicts an example method enabling task-related sorting, application discovery, and unified bookmarking for application managers.

FIG. 3 depicts an example method 300 enabling task-related sorting, application discovery, and unified bookmarking for application managers. The method 300 can be performed with an electronic device such as the electronic device 102. The method 300 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIG. 2, reference to which is made for example only. The techniques are not limited to performance by one entity or multiple entities operating on one device.

At 302, an analysis of activities associated with applications running on the electronic device is performed. The analysis may be performed by any of a variety of entities, such as the application manager 108 (including the context manager 202 and/or the linking manager 204).

At 304, it is determined, based on the analysis, that at least two particular activities are related activities that are included in a task. The determination may be performed by any of a variety of entities, such as the application manager 108 (including the context manager 202 and/or the linking manager 204). For example, the application manager may determine that a user email, a user interaction with a calendar application, and a user interaction with a restaurant's online reservation system are related activities that comprising a scheduling task (e.g., scheduling a lunch meeting).

At 306, a task group that includes representations of the respective applications associated with the related activities is presented on a display of the electronic device. The representations can be any of a variety of visual representations, such as a window, a thumbnail, or an icon, and are usable to launch the respective associated applications. Optionally, the task group may be presented with a label (e.g., "lunch meeting"). As described with reference to FIG. 1, the label can be based on content of one or more of the related activities, may be generated automatically (e.g., by the application manager 108) and editable by the user. In other cases, the user may be provided a user interface that allows the user to create or select the label for the task group.

In some implementations, the task group may be created by the user bookmarking or pinning content and designating it as related. For example, the user may provide an input indicating that one or more activities are related activities. The activities may be associated with an application already included in the task group or with other respective applications. Based on the user input, a new task group can be created or representations of the other respective applications can be added to an existing task group (e.g., by the application manager 108, either automatically or via user interaction). As described with reference to FIG. 1, user inputs to create or add to the task group can take any of a variety of formats, such as a drag-and-drop input, an input from a menu or a dedicated control (e.g., a "pin" or "bookmark" control), and so forth.

In some implementations, an available upgrade to an application presented in the task group may be determined (e.g., by the application manager 108), such as an upgrade that can be used to perform one or more activities, or parts of activities, of the task. Similarly, a new application may be determined (e.g., an application that is available, but not currently associated with the electronic device) that can be used to perform one or more activities, or parts of activities, of the task. When an upgrade or available application is determined, a selectable control can be displayed, which can be used to enable the upgrade or the new application to be installed.

In some implementations, the described operations (the analysis of the activities, the determination of the related activities that are included in the task, and the presentation of the task group) are performed automatically, without user input or instruction. In other cases, some or all of the steps may be performed at the direction of the user, or the user may be provided with a user interface (e.g., a dialog window) that allows the user to decide whether the application manager should create the task group.

Once a task group comes into existence, a user may edit the task group. For example, the user can provide an input indicating that one or more of the activities is not a related activity. In response, the representations of the respective application associated with the indicated activities can be removed from the task group. Similarly, the user may indicate that an additional activity that was not initially determined to be a related activity, is a related activity. In response, a new representation of the respective application associated with the indicated activity can be added to the task group. As described with reference to FIG. 1, user inputs to edit a task group can take any of a variety of formats.

In some implementations, user input that corresponds to the related activities can be analyzed (e.g., by the application manager 108) and, based on the user input, one or more processes that correspond to one or more of the analysis of the activities associated with applications running on the electronic device or the determining that at least two particular activities are related activities that are included in a task, can be modified such that an accuracy of the determination of related activities is improved. For example, as described with reference to FIG. 2, consider a task group that includes several representations. The user may review the task group and determine that one representation is associated with a repeating calendar reminder that does not belong in the group. In this case, a process (e.g., a process of the application manager 108) can be taught that repeating calendar reminders are not to be included in task groups unless the context of the repeating reminder is unmistakably related to the other items in the task group. In this way, subsequently created task groups may more-accurately reflect related activities and thereby save the user time and improve the user's experience.

Example Implementations

Figure 4:
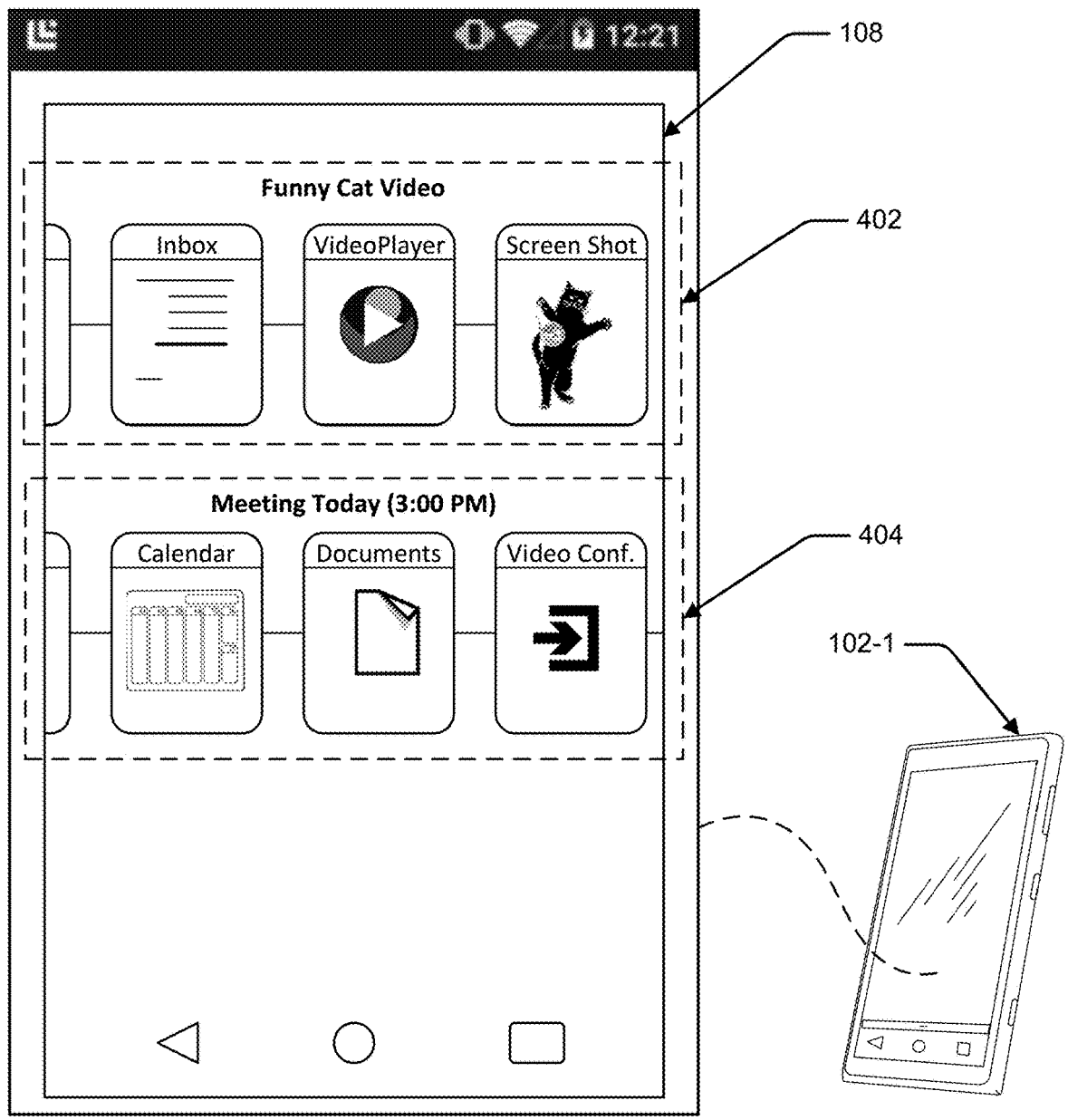
FIGS. 4-7 illustrate example implementations of task-related sorting, application discovery, and unified bookmarking for application managers.
Figure 5:
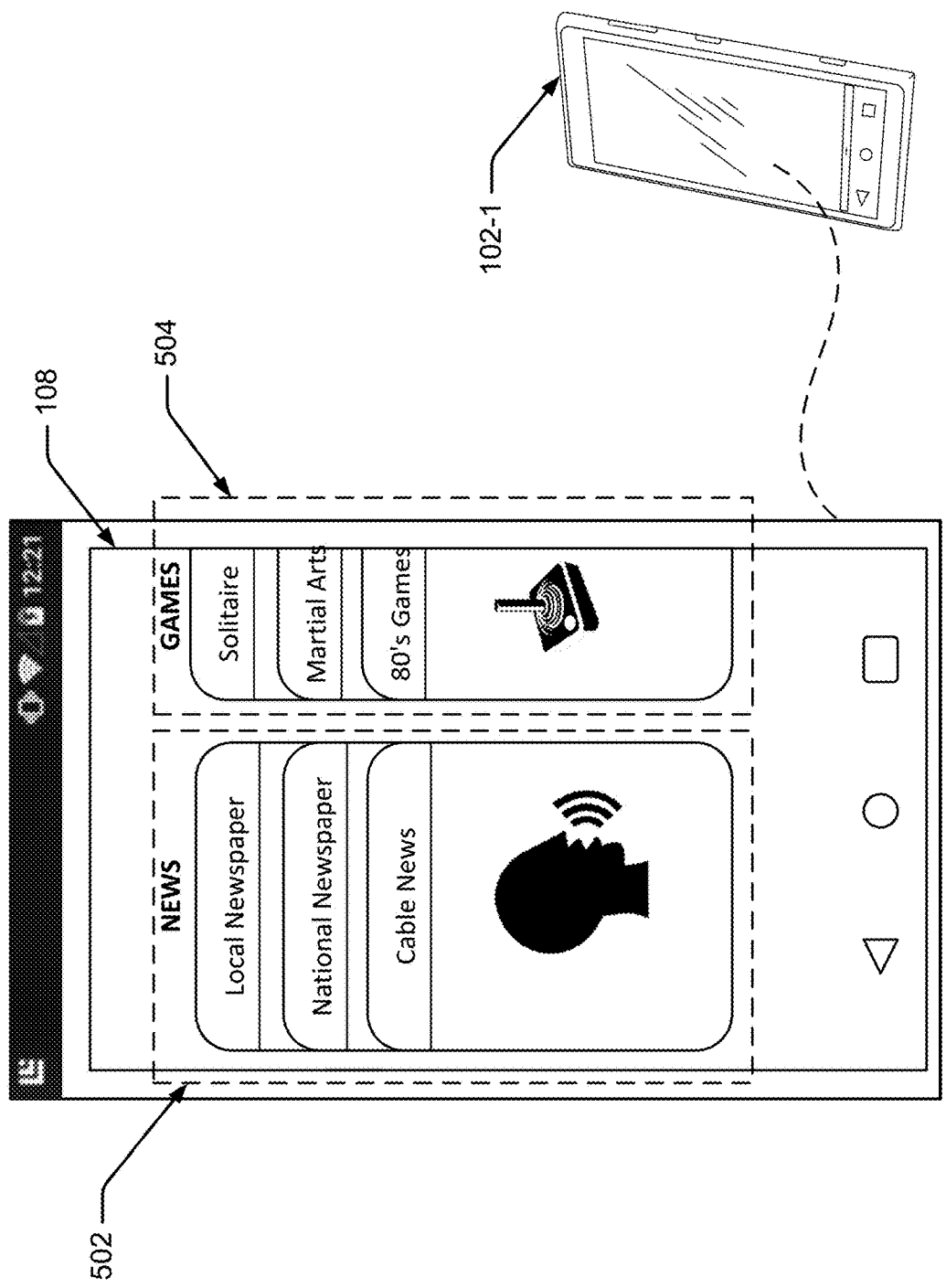
Figure 6:
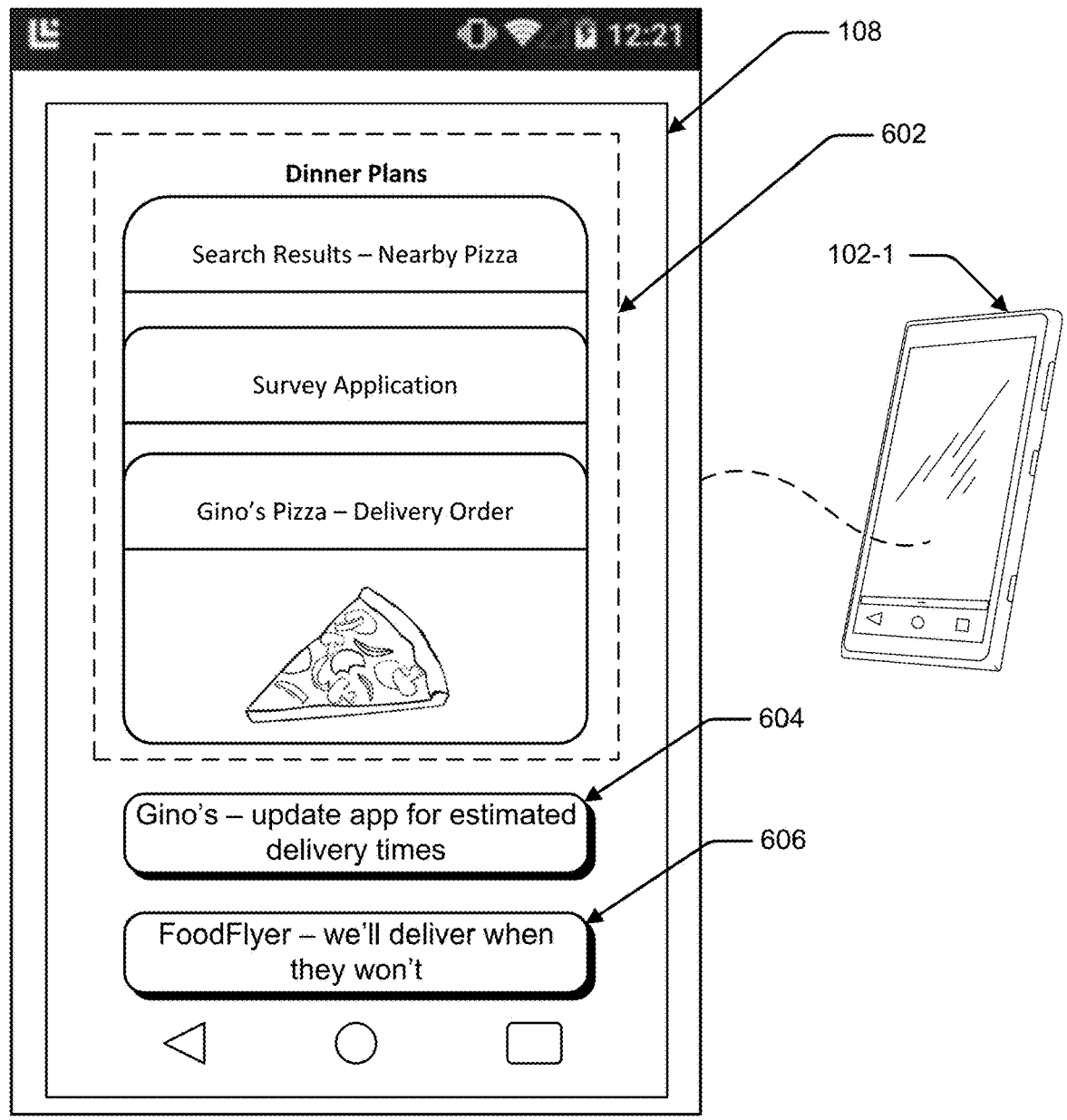
Figure 7:
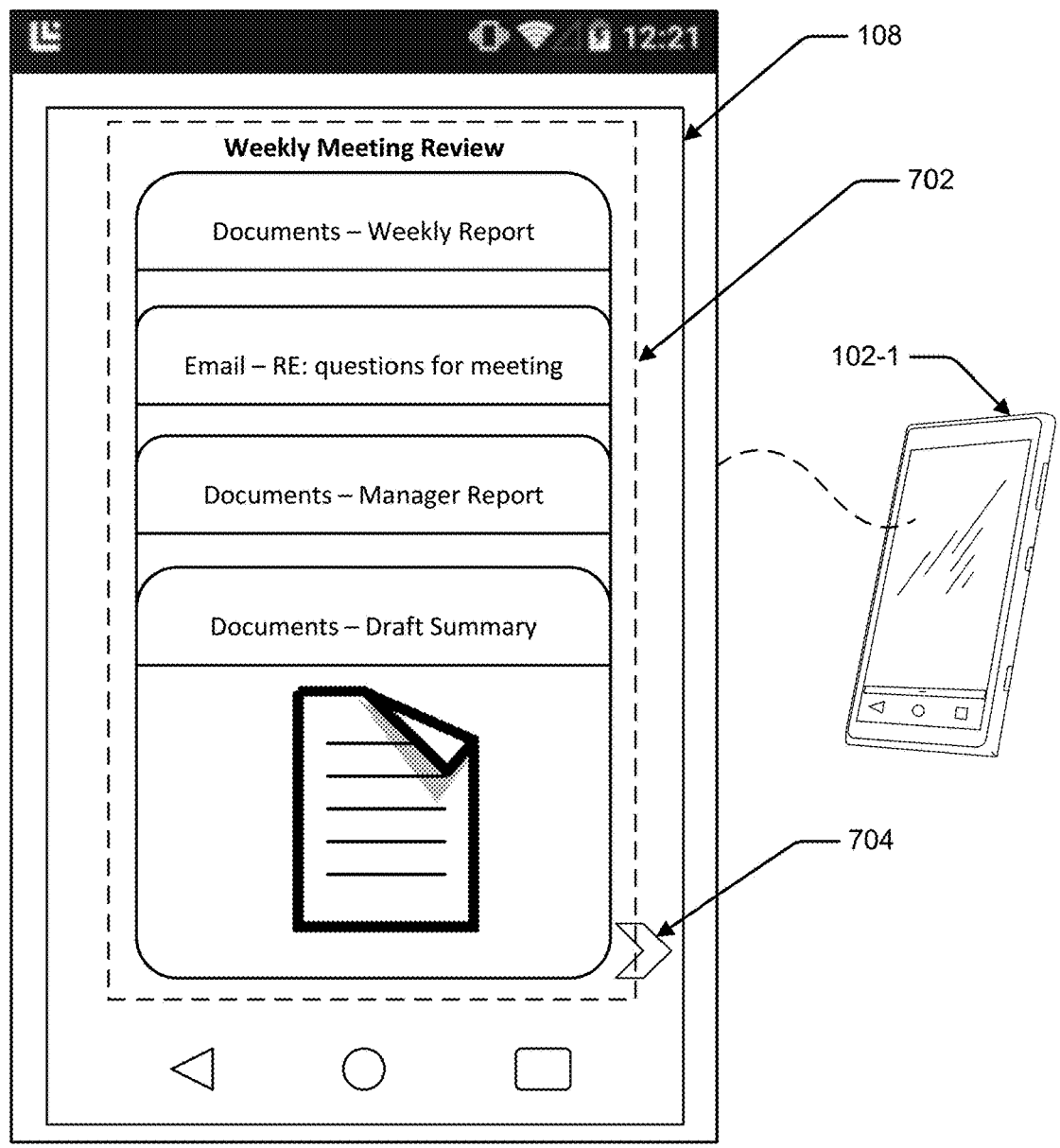

FIG. 4, FIG. 5, FIG. 6, and FIG. 7 depict example implementations of task-related sorting, application discovery, and unified bookmarking for application managers. FIG. 4 and FIG. 5 describe implementations in which an application manager (e.g., the application manager 108) displays related activity representations in a task group. FIG. 6 describes an implementation in which an application that does not have visibility of the user's other activity on the device can be given access to the activity data to allow the application to offer additional functionality based on the user's other activity. FIG. 7 describes an implementation in which a technique for unified bookmarking (or pinning) is provided. The technique enables the application manager to create the task group (that is also displayed by the application manager) based on related items or content (e.g., from applications, web pages, screenshots, or documents) that users bookmark or pin.

These and other implementations herein are shown and described as techniques and operations performed but are not necessarily limited to the order or combinations in which the techniques and operations are shown herein. Further, any of one or more of the operations may be repeated, combined, reorganized, or linked to provide a wide array of additional and/or alternate methods. In portions of the following discussion reference may be made to the environment 100 of FIG. 1 and as detailed in FIG. 2, reference to which is made for example only. The techniques are not limited to performance by one entity or multiple entities operating on one device.

FIG. 4 illustrates an example implementation 400 of the electronic device 102 (in this case, the smartphone 102-1) of FIG. 1, which can implement task-related sorting, application discovery, and unified bookmarking for application managers. In the example implementation 400, two example task groups are shown, a "Funny Cat Video" group 402 (video group 402) and a "Meeting Today" group 404 (meeting group 404). The task groups 402 and 404 both include three representations of different user activity or content that are related (e.g., related activities, as described above).

As shown in FIG. 4, the video group 402 includes a first representation that is labeled "Inbox," which represents an email application through which a person received an email containing a link to a video of a cat doing something amusing. A second representation is labeled "Video Player" and represents an application or website that can play videos, and a third representation labeled "Screen Shot" represents an image-viewing application that can show a still image captured from the video by the person. In the example video group 402, assume that the person received the email, viewed the video, and captured a still image of the video (e.g., the screen shot). Automatically and without an explicit input or selection by the person, the application manager 108 recognized the three activities as related to a task and put them in a task group (e.g., using information discovered by the context manager 202 or the linking manager 204 as described above). The application manager 108 also provided a label for the group ("Funny Cat Video"), which may be generated by the application manager 108 based on any of a variety of sources (e.g., text from the email, a title of the video, or an annotation to the captured image).

The meeting group 404 includes a first representation that is labeled "Calendar," which represents a calendar application in which the person scheduled a meeting. A second representation is labeled "Documents" and represents a word processing application (or a document-sharing application), and a third representation that is labeled "Video Conf." representing a video-conferencing application. In the meeting group 404, assume that the person scheduled the meeting on the calendar application and created an online meeting with the video-conferencing application. The person attached documents (and a link to the document-sharing application) to the calendar event and the video conference. Automatically and without an explicit input or selection by the person, the application manager 108 recognized the three activities as related activities and put them in a task group (e.g., using information discovered by the context manager 202 or the linking manager 204). The application manager 108 also provided a label for the group ("Meeting Today (3:00 PM)"), which may be generated by the application manager 108 based on based on any of a variety of sources (e.g., information from the calendar event or video conference or text from the documents).

FIG. 5 shows another example implementation 500 of the electronic device 102 (in this case, the smartphone 102-1) of FIG. 1 that can implement task-related sorting, application discovery, and unified bookmarking for application managers. In the example implementation 500, two example task groups are shown, a "NEWS" group 502 (news group 502) and a "GAMES" group 504 (games group 504). The task groups 502 and 504 both include three visible representations that represent different applications or websites through which user activity or content can be performed or accessed, and which are related by the category of activity.

For example, in FIG. 5, the news group 502 includes three representations. A first representation is labeled "Local Newspaper" and represents a website or application for a newspaper with local circulation. A second representation is labeled "National Newspaper" and represents an application or website for a newspaper with national circulation. A third representation is labeled "Cable News" and represents an application or website for a national cable-television news organization.

In the example implementation 500, assume that a person viewed content, using the applications or websites represented by the three representations, over a period of time. Automatically and without an explicit input or selection by the person, the application manager 108 recognized the three activities as being similar types of applications and put them in the task group 502 with a "NEWS" label (e.g., using information discovered by the context manager 202 or the linking manager 204). The label may be generated by the application manager 108 based on information from the application or website that the person viewed.

Similarly, the games group 504 also includes three representations. The games group 504 includes a first representation that is labeled "Solitaire" and represents a card game application. A second representation is labeled "Marital Arts" and represents a martial arts combat game. A third representation that is labeled "80's Games" represents a website that allows users to play arcade games from the 1980's. In the example games group 504, the person played several games over a period of time. Automatically and without an explicit input or selection by the person, the application manager 108 recognized the activities with the three applications as being similar types of activities and applications and put them in the task group 504 with a "GAMES" label (e.g., using information discovered by the context manager 202 or the linking manager 204). The label may be generated by the application manager 108 based on information from the application or website from which the game was played.

FIG. 6 illustrates another example implementation 600 of the electronic device 102 (in this case, the smartphone 102-1) of FIG. 1 that can implement aspects of task-related sorting, application discovery, and unified bookmarking for application managers. In the example implementation 600, at least one service that provides new applications and updates to currently installed applications on the electronic device 102-1 does not have visibility of the user's other activity on the electronic device 102-1.

The example implementation 600 is similar to the case, described above, in which a person plans to order pizza for a work team meeting the next evening. The person uses a search application to find several nearby pizza restaurants. Then, during the meeting, the person uses a survey application to take a vote of the participants to choose between the restaurants and opens the application manager 108 to quickly find the ordering application for the selected restaurant. This scenario is illustrated by an example "Dinner Plans" group 602, which includes a search engine results representation, a survey application representation, and a restaurant delivery application representation. As noted, however, the delivery time for the selected restaurant is long, and the pizza will arrive too late for the meeting.

Additionally, using the described techniques, the application manager 108 can automatically (e.g., without explicit input or selection by the person) provide suggestions for upgrading or downloading applications to address some elements of the task or problem. For example, a notification window 604 describes an update to the restaurant delivery application that provides estimated delivery times (while this update is useful for future orders, it does not necessarily address the person's current problem). Another notification window 606, describes a new application (FoodFlyer) for a third-party service that will deliver food orders if the restaurant does not offer delivery or, as in this case, if the restaurant's delivery time is too long. The person can use a selectable control in the other notification window 606 to download the application and get the order delivered in time for the meeting.

In another example (not illustrated), the application manager 108 may display other notification windows that describe the availability of in-app purchases for installed applications that are related to a task group. For example, the person may regularly use an application for a favorite coffee-shop franchise. When traveling, the person can use the application to find nearby locations. When the person checks the application manager 108 to review locations in a new city or on a return visit, the application manager 108 may provide a notification window associated with the coffee-shop franchise group that describes an in-app purchase that enable the franchise's application to provide alerts and notifications of new and nearby franchise locations.

FIG. 7 illustrates another example implementation 700 of the electronic device 102 (in this case, the smartphone 102-1) of FIG. 1 that can implement still other aspects of task-related sorting, application discovery, and unified bookmarking for application managers. The example implementation 700 is similar to the case, described above, in which a person prepares for a morning meeting by reviewing related emails and documents and wants to prepare an agenda that summarizes the discussion about the documents. As noted, because of an intervening meeting, the person does not have time to write the summary before the intervening meeting. In the example implementation 700, the person can bookmark or pin the documents together as a single task group that can be viewed later from the application manager 108.

This scenario is illustrated by an example "Weekly Meeting Review" task group 702, which includes three representations of applications for creating and displaying documents (a weekly report representation, a manager report representation, and a draft summary representation) and an email application representation, which represent the applications the person used for the review. As noted, the person can bookmark or pin the three documents and the email as a task and the application manager 108 can create and present the task group 702, with attachments and links included. In some implementations, the application manager 108 may include a share control 704 that can be used to share the weekly meeting review group with other applications, such as a calendar, an email application, or a task manager application.

While the above examples described with reference to FIGS. 1-7 are directed to applications and websites on a smartphone, these are not the only content sources and devices contemplated by the described techniques. Other devices, including devices connected via an internet of things (IoT) network, and applications (e.g., instant applications, digital media, or raw data), and so forth can be used with the techniques.

Further to the descriptions above, a user may be provided with controls allowing the user to make an election as to both whether and when systems, programs or features described herein may enable collection of user information (e.g., information about a user's social network, social actions or activities, profession, a user's preferences, or a user's current location), and whether the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to or about the user.

Example Computing System

Figure 8:
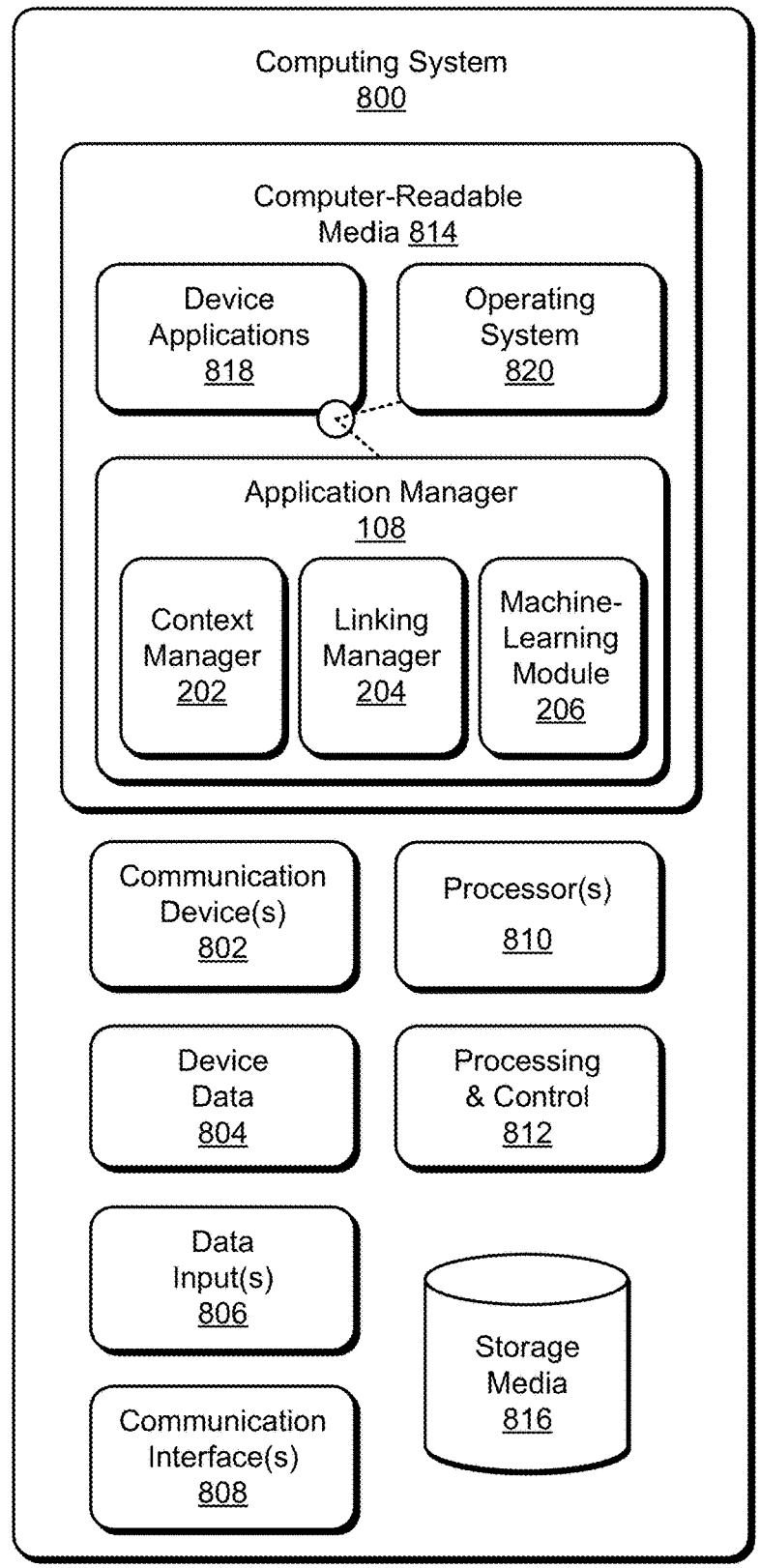
FIG. 8 illustrates various components of an example computing system that can be implemented as any type of client, server, and/or electronic device as described with reference to the previous FIGS. 1-7 to implement task-related sorting, application discovery, and unified bookmarking for application managers.

FIG. 8 illustrates various components of an example computing system 800 that can be implemented as any type of client, server, and/or electronic device as described with reference to the previous FIGS. 1-7 to implement task-related sorting, application discovery, and unified bookmarking for application managers.

The computing system 800 includes communication devices 802 that enable wired and/or wireless communication of device data 804 (e.g., radar data, application data, phone session data, authentication data, reference data, received data, data that is being received, data scheduled for broadcast, data packets of the data). The device data 804 or other device content can include configuration settings of the device, media content stored on the device, and/or information associated with a user of the device (e.g., an identity of a person using the device). Media content stored on the computing system 800 can include any type of radar, biometric, audio, video, and/or image data. The computing system 800 includes one or more data inputs 806 via which any type of data, media content, and/or inputs can be received, such as human utterances, interactions with a radar field, touch inputs, user-selectable inputs (explicit or implicit), messages, music, television media content, recorded video content, and any other type of audio, video, and/or image data received from any content and/or data source. The data inputs 806 may include, for example, the application manager 108, the context manager 202, the linking manager 204, or the machine-learning module 206.

The computing system 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between the computing system 800 and a communication network by which other electronic, computing, and communication devices communicate data with the computing system 800.

The computing system 800 includes one or more processors 810 (e.g., any of microprocessors, controllers, or other controllers) that can process various computer-executable instructions to control the operation of the computing system 800 and to enable techniques for, or in which can be implemented, radar-based gesture enhancement for voice interfaces. Alternatively or additionally, the computing system 800 can be implemented with any one or combination of hardware, firmware, or fixed logic circuitry that is implemented in connection with processing and control circuits, which are generally identified at 812. Although not shown, the computing system 800 can include a system bus or data transfer system that couples the various components within the device. The system bus can include any one or combination of different bus structures, such as a memory bus or memory controller, a peripheral bus, a universal serial bus, and/or a processor or local bus that utilizes any of a variety of bus architectures.

The computing system 800 also includes computer-readable media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 800 can also include a mass storage media device (storage media) 816.

The computer-readable media 814 provides data storage mechanisms to store the device data 804, as well as various device applications 818 and any other types of information and/or data related to operational aspects of the computing system 800. For example, an operating system 820 can be maintained as a computer application with the computer-readable media 814 and executed on the processors 810. The device applications 818 may include a device manager, such as any form of a control application, software application, signal-processing and control modules, code that is native to a particular device, an abstraction module, a gesture recognition module, and other modules. The device applications 818 may also include system components, engines, or managers to implement task-related sorting, application discovery, and unified bookmarking for application managers, such as the application manager 108, the context manager 202, the linking manager 204, or the machine-learning module 206.

CONCLUSION

Although embodiments of techniques enabling task-related sorting, application discovery, and unified bookmarking for application managers have been described in language specific to features and/or methods, it is to be understood that the subject of the appended claims is not necessarily limited to the specific features or methods described. Rather, the specific features and methods are disclosed as example implementations of ways in which to perform task-related sorting, application discovery, and unified bookmarking for application managers.

What is claimed is:

1. An electronic device, comprising:
one or more computer processors; and
one or more computer-readable storage media having instructions stored thereon that, responsive to execution by the one or more computer processors, implement an application manager configured to:
  present a first user-selectable control on a display, the display included or associated with the electronic device;
  receive user input through the first user-selectable control, the user input indicating that one or more items associated with applications running on the electronic device are related to a task; and
  based on the user input, present a task group on the display, the task group comprising representations of the respective applications associated with the one or more related items, the representations usable to launch the respective applications.

2. The electronic device of claim 1, wherein the application manager is further configured, when the representation of at least one of the respective applications is used to launch the at least one respective application, to cause the launched application to open in a saved state, the saved state similar to an original state in which the application was operating when the application manager received the user input indicating that the respective item is related to the task.

3. The electronic device of claim 1, wherein the application manager is further configured to:
based on the user input, create screenshots of the respective items associated with the applications, the screenshots comprising images of the respective items as the respective items appeared when the application manager received the user input indicating that the respective item is related to the task; and
present a second user-selectable control usable to cause the application manger to present the screenshots on the display.

4. The electronic device of claim 1, wherein the application manager is further configured to:
determine an available upgrade to an application presented in the task group, the upgrade usable to perform one or more activities related to the task;
determine an available application, not currently associated with the electronic device, that is usable to perform one or more activities related to the task; and
display a second user-selectable control configured to:
  enable the upgrade to the application to be installed on the electronic device; and
  enable the available application to be installed on the electronic device.

5. The electronic device of claim 1, wherein the application manager is further configured to:
present a second user-selectable control on the display;
receive other user input through the second user-selectable control, the other user input indicating that at least one of the one or more items, previously indicated by the user input as being related to the task, is no longer related to the task;
responsive to the other user input, remove from the task group the representation of the respective application associated with the item indicated by the other input as being no longer related to the task.

6. The electronic device of claim 1, wherein the application manager is further configured to automatically present, on the display when the task group is presented, a second user-selectable control, the second user-selectable control allowing the user to create label for the task group.

7. The electronic device of claim 1, wherein the application manager is further configured to automatically present, on the display, a label for the task group, the label based on content of one or more of the related items.

8. The electronic device of claim 1, wherein the items related to the task include one or more of digital media content, a user interface of the respective applications associated with the items, or a website.

9. The electronic device of claim 8, wherein the digital media content comprises a document, an image, a video, an audio clip, or a screenshot of a user interface of an application.

10. The electronic device of claim 1, wherein the user input comprises one or more of:
a drag-and-drop input;

an input from a menu; or an input from a dedicated control.

11. A method implemented by an electronic device, the method comprising:

presenting, on a display included or associated with the electronic device, a first user-selectable control;

receiving user input through the first user-selectable control, the user input indicating that one or more items associated with applications running on the electronic device are related to a task; and presenting a task group on the display, based on the user input, the task group comprising representations of the respective applications associated with the one or more related items, the representations usable to launch the respective applications.

12. The method of claim 11, further comprising causing, when the representation of at least one of the respective applications is used to launch the at least one respective application, the launched application to open in a saved state, the saved state similar to an original state in which the application was operating when the user input indicating that the respective item is related to the task is received.

13. The method of claim 11, further comprising:

based on the user input, creating screenshots of the respective items associated with the applications, the screenshots comprising images of the respective items as the respective items appeared when the user input indicating that the respective item is related to the task is received; and presenting a second user-selectable control usable to cause the screenshots to be presented on the display.

14. The method of claim 11, the method further comprising:

determining an available upgrade to an application presented in the task group, the upgrade usable to perform one or more activities related to the task;

determining an available application that is not currently associated with the electronic device, the available application usable to perform one or more activities related to the task; and displaying a second user-selectable control configured to enable installation of:

the upgrade to the application on the electronic device; and the available application on the electronic device.

15. The method of claim 11, the method further comprising:

presenting a second user-selectable control on the display;

receiving other user input through the second user-selectable control, the other user input indicating that at least one of the one or more items, previously indicated by the user input as being related to the task, is no longer related to the task; and based on the other user input, removing from the task group the representation of the respective application associated with the item indicated by the other input as being no longer related to the task.

16. The method of claim 11, the method further comprising automatically presenting, on the display when the task group is presented, a second user-selectable control, the second user-selectable control allowing the user to create label for the task group.

17. The method of claim 11, the method further comprising automatically presenting, on the display when the task group is presented, a label for the task group, the label based on content of one or more of the related items.

18. The method of claim 11, wherein the items related to the task include one or more of digital media content, a user interface of the respective applications associated with the items, or a website.

19. The method of claim 18, wherein the digital media content comprises a document, an image, a video, an audio clip, or a screenshot of a user interface of an application.

20. The method of claim 10, the method further comprising presenting a sharing control on the display, the sharing control usable to share the task group with another application.

* * * * *